United States Patent [19]
Jeskey

[11] 3,982,954
[45] Sept. 28, 1976

[54] POZZOLAN AND CONCRETE PRODUCT THEREOF

[75] Inventor: Carl C. Jeskey, Susanville, Calif.

[73] Assignee: Mt. Lassen Cinder Company, Susanville, Calif.

[22] Filed: Apr. 12, 1974

[21] Appl. No.: 460,311

Related U.S. Application Data

[60] Continuation of Ser. No. 236,519, March 20, 1972, abandoned, which is a division of Ser. No. 54,025, July 10, 1970, abandoned.

[52] U.S. Cl. .................................................. 106/97
[51] Int. Cl.² ............................................ C04B 7/02
[58] Field of Search .................... 106/97, 98, DIG. 1

[56] References Cited
UNITED STATES PATENTS

| | | | |
|---|---|---|---|
| 2,752,261 | 6/1956 | Dournaud | 106/97 |
| 2,786,531 | 3/1957 | Mangold et al. | 106/97 |

*Primary Examiner*—J. Poer
*Attorney, Agent, or Firm*—Townsend and Townsend

[57] ABSTRACT

An improved pozzolan is fabricated from scoria cinder processed to a particle size below 10,000 Blaine. When incorporated with the cement in a concrete mixture, this pozzolan imparts rapid tensile strength to the concrete upon curing. A new and improved concrete is also provided which consists solely of cement and scoria cinder aggregate of graded particle size.

5 Claims, No Drawings

POZZOLAN AND CONCRETE PRODUCT THEREOF

This is a continuation of application Ser. No. 236,519, filed Mar. 20, 1972, which was a division of application Ser. No. 54,025, filed July 10, 1970, both now abandoned.

This invention relates to scoria cinder pozzolans and scoria cinder aggregate additives for use in concrete mixtures.

The use of pozzolans in concrete mixtures is notoriously old. It has been known since antiquity that pozzolans when incorporated within the fine aggregate components of concrete mixtures impart improved compressive strength to the concrete when the concrete is fully cured.

Heretofore, pozzolans used have included diatomaceous earth, pumice, and ash (the latter being obtained from the combustion of certain coals and oil). All of these pozzolans, however, contain disadvantages.

Diatomaceous earth has the disadvantage of being extremely absorbent. Commonly this earth must be calcined to remove ambient water found in its natural state. Moreover, when used in concrete product, diatomaceous earth absorbs inordinate amounts of water. This high water absorption results in a concrete product which is not frostproof; when exposed to fluctuating temperatures, the concrete containing this product frequently chips and splays away.

Pumice as a pozzolan is frequently too soft to impart the desired high tensile strength to concrete. Moreover, pumice frequently contains a high silica content which when used as a pozzolan additive imparts to the finished concrete product a silica content in excess of 10%. Such high silica contents result in a reactive concrete mixture which shrinks excessively upon curing.

Ash from the combustion of coal and oil has the disadvantages of containing sulfur. Such ash must either be produced from the combustion of rare coals and oil having low sulfur contents or alternatively processed to remove the sulfur. Moreover, as the color of ash pozzolans is uniformly black, it imparts an objectionable dark color to the finished concrete structure.

All pozzolans heretofore commercially used have the disadvantage of requiring inordinate amounts of time for curing. Typically, pozzolans of diatomaceous earth, pumice, or ash must cure from 60–90 days before they reach the compressive strength of pozzolan-free concrete. This extended curing time requires that the forms used be maintained about the curing concrete mixture for longer intervals of time. Often such extended curing time provides an unacceptable delay to construction; the result is that such pozzolans are emitted.

Moreover, all of the above pozzolans heretofore known have a specific gravity in the range of 2.12 to 2.3. These pozzolans when mixed with cement having a specific gravity substantially of 3.1 are difficult to maintain in homogeneous distribution throughout the concrete mixture. Typically, the low specific gravity pozzolans require much greater mixing of the concrete. Moreover, when mixed, the pozzolans exhibit a tendency to separate from the concrete mixture.

According to this invention, a concrete mixture including a scoria pozzolan is provided. The scoria pozzolan of this invention has a specific gravity of about 2.8. Thus, this pozzolan is much easier to mix into concrete and much easier to maintain mixed in the concrete during the curing process. The improved concrete mixture of this invention has a low moisture content. With such low moisture content, the concrete can cure at temperatures below freezing, and when cured is substantially frost resistant. Further, concrete mixtures containing the improved pozzolan of this invention readily dissipate the large amounts of heat generated in concrete curing. Accordingly, expensive artificial cooling techniques are not necessary.

It has been found that concrete mixtures containing scoria pozzolan exhibit, upon rapid curing, a compressive strength exceeding that of pozzolan free mixtures. When pozzolan is mixed with the cement to be used in the concrete formulation, wherein the pozzolan constitutes 10 to 30% by weight of the cement-pozzolan mixture, a 3 day cure concrete is provided having a compressive strength equivalent to that of a 7 day cure concrete without a pozzolan additive. Compressive strength continues to increase for the pozzolan containing concrete as cure time is increased.

Concrete containing less than 10 weight percent scoria pozzolan will exhibit improved strength but to a lesser degree. At contents over 30% due to the reduction of cementious material, strength decreases. Where rapid cure strength is not of primary importance, the cement-pozzolan mixture can comprise as little as 5% and as much as 50% by weight scoria pozzolan.

Particularly rapid cure times are obtained wherein the grain size of the pozzolan is generally from 2,000 to 10,000 Blaine. Particle sizes below 2,000 Blaine are also suitable though longer cure times are required to achieve the same strength. The most rapid cure times are obtained with scoria of intermediate particle size, preferably around 3,400 Blaine.

The improved scoria pozzolan of this invention is obtained from scoria cinders. These cinders consist of small crystals of plagioclase and pyroxene enclosed in a mesh of still smaller crystals of these minerals and subordinate dark colored glasses. The raw rock itself is porus and usually red or gray. It has a density of approximately 2.8.

Typically, scoria cinder is dug or scraped from its ambient location and crushed to a particle size in the range of one-half inch. Thereafter, the scoria cinder is kiln dried to a moisture content of 6% by total weight or less. Moisture contents of 3% or less are preferred. The dried scoria is placed in a ball mill and ground to a Blaine particle size in the range of 2,000–10,000. After grinding, the particles are passed through an air separator, which separator when set to the proper Blaine size passes particles below the dimension and returns particles above the Blaine dimension for further grinding.

The scoria pozzolans may be incorporated with commonly available cements such as the Portland cement, types I through V.

In formulating the concrete mixes of this invention, the amount of cement to be added to the concrete mix is first determined based on the ultimate compressive strength requirements for the concrete. Then sufficient scoria pozzolan is added to the cement so that the pozzolan constitutes 10 to 30 weight percent of the cement-pozzolan mixture, the appropriate amount of coarse and fine aggregate thereafter added. By adding pozzolan, the ultimate compressive strength of the concrete is increased.

Alternatively, an equivalent weight of cement can be replaced by the scoria pozzolan. In this case less cement is used in the concrete formulation, thus reducing costs, scoria pozzolan less expensive than cement. However, longer cure times are required to achieve the same compressive strengths obtainable with the pozzolan free concrete. This is due to the decrease in cementious materials present. Even though longer cure times are required, with the pozzolan of this invention greater compressive strengths are achieved than for concretes containing the pozzolans of the prior art. These longer curing, lower cost concretes can be employed where length of cure times is not of primary consideration.

By way of this invention, it has also been found that an improved concrete can be formulated with cement and scoria cinder alone. Gravel and sand, usually formulated with cement, are replaced by scoria cinder of a graded particle size. Particle sizes range from one inch down to 0.0029 inches or less, with 18.8% of the scoria cinder ground to a particle size which will pass through a 100 mesh screen, and 10.7% which will pass through a 200 mesh screen. Generally about 3 to 4 pounds of scoria cinder will be mixed with each pound of cement.

A typical formulation for the 100% cinder concrete of this invention is as follows:

| Constituent | Pounds | Percent by Weight |
| --- | --- | --- |
| Cement | 611 | 20.6% |
| Water | 255 | 8.6% |
| Coarse aggregate (scoria cinder ⅛"–1") | 850 | 28.7% |
| Fine aggregate (scoria cinder ⅛"–200 mesh) | 1245* | 34.5% |

*18.8% smaller than 100 mesh.

The amount of water formulated with the concrete of this invention is about the same as for conventional concretes and will vary for given concrete materials and ultimate properties desired. The quantity of mixing water used per bag of cement determines the strength of the concrete, so long as the mix is of workable plasticity. This relationship fits all combinations of different cements and aggregates in a qualitative manner. About 25% water, based on the weight of cement, is usually added to a concrete formulation, though it is common to employ as much as 35%, and even 100%.

The superiority of the scoria containing concretes of this invention are illustrated by the following examples.

EXAMPLE I

Three concrete mixtures were prepared, two employing scoria pozzolan. The concrete mixtures were molded into 2 inch × 2 inch blocks and allowed to cure. Compression tests were run on the samples after 3, 7, 14 and 28 day cures.

The ASTM Sample and Control Mix were formulated according to ASTM procedures C150-68 and C109-64. The Federal Sample was formulated according to the Bureau of Reclamation standards, Portland cement, Type I, was used in all formulations.

TABLE 1

| ASTM SAMPLE | | COMPRESSION STRENGTH (PSI) 2" × 2" cubes |
| --- | --- | --- |
| 1850 g | graded sand | 3 day - 3375 |
| 185 g | scoria pozzolan (20 wt. %) | 7 day - 5237 |
| 740 g | cement (Type) water* | 14 day - 6307 28 day - 7200 |
| FEDERAL SAMPLE | | |

TABLE 1-continued

| 481 g | cement (Type I) | 3 day - 1268 |
| --- | --- | --- |
| 232 g | scoria pozzolan (33 wt. %) | 7 day - 1937 |
| 2035 g | graded sand water* | 14 day - 2524 28 day - 3008 |
| CONTROL MIX Standard Cement Formulation | | |
| 740 g | cement (Type I) | 3 day - 2324 |
| 2035 g | graded sand water* | 7 day - 3375 15 day - 4735 28 day - 5500 |

*Sufficient water was added to each sample so as to produce a concrete having a flow of 100 to 115 as determined by ASTM C109-64, Sec. 9.

The scoria pozzolan employed in the above formulations has the following physical and chemical properties.

| Chemical - % | | |
| --- | --- | --- |
| $SiO_2$ | - | 48.2 |
| $Fe_2O_3$ | - | 5.0 |
| $Al_2O_3$ | - | 14.8 |
| CaO | - | 17.4 |
| MgO | - | 7.0 |
| $SO_3$ | - | 0.2 |
| Ing. Loss | - | 1.2 |

Physical
Blaine — 3420 — after 12 hrs. grinding in pebble mill
Specific Gravity — 2.83
Tests were run according to ASTM C-311-68.

As evident from Table 1, incorporation of scoria pozzolan into concrete significantly increases compressive strength. A 3 day cure affords a concrete almost as strong as a standard concrete cured for 7 days. After 28 days the concrete of this invention has a compressive strength 131% of that of the standard concrete (control mix).

Replacement of cement with scoria pozzolan so that the weight of the pozzolan exceeds 30% decreases compressive strength of the concrete mixture. However, the strength of this concrete is far superior to those wherein conventional pozzolans are employed. For example, a fly ash pozzolan-Portland cement concrete formulated according to the Bureau of Reclamation standards containing 30% fly ash and 70% cement exhibits the following cure times, as reported in Significance of Tests and Properties of Concrete and Concrete Aggregates, ASTM, (1956), P384.

| Length of Cure | COMPRESSIVE STRENGTH (PSI) |
| --- | --- |
| 30 days | 2100 |
| 60 days | 2600 |
| 128 days | 3200 |

With concrete containing a somewhat greater percent of the scoria pozzolan of this invention considerably greater strengths were achieved after only 28 days, i.e. the scoria pozzolan containing concrete had a 28 day cure strength only slightly less than the 128 day cure strength of the fly ash cement concrete.

EXAMPLE II

A 100% scoria cinder concrete was made up according to the following formulation.

| Constituent | Pounds | Percent by Weight |
|---|---|---|
| Cement | 611 | 20.6% |
| Water | 255 | 8.6% |
| Coarse aggregate (Scoria Cinder ⅛"-1") | 850 | 28.7% |
| Fine Aggregate (Scoria Cinder ⅛"-200 mesh) | 1245* | 34.5% |

*18.8% smaller than 100 mesh

The concrete was molded into blocks and allowed to cure. Compression tests were run on the samples after 7, 14 and 28 days, and after 6 months.

| Cure Time | Compressive Strength (PSI) |
|---|---|
| 7 days | 2600 |
| 14 days | 3800 |
| 28 days | 4400 |
| 6 months | 6300 |

A desirable concrete was obtained which compares favorably in strength to the pozzolan free concretes.

Concrete employing the scoria cinder can be used in all applications common for cement formulations such as in general construction, dams, building blocks, etc.

As the improved concretes of this invention are frost proof, neither expanding nor contracting in response to freezing and thawing conditions, and are acid proof and uneffected by salt, they are ideally suited for highways and other roadbed applications, especially in areas where snow occurs (salt treatment of the roadbed being common). Further, the concretes of this invention are impervious to water due to greatly reduced average pore size. Concrete cinder blocks employing the scoria cinder of this invention therefore have particular utility in subsurface applications where water leakage is often encountered. Because of their imperviousness to water, these cinder blocks need not be water proofed, as is required with conventional materials. The concrete formulations of this invention also exhibit low heat transmission in the order of approximately 1.30 btu/hour/inch. This insulating property may be readily taken advantage of in house construction. Walls constructed of such material are sufficiently self insulating, so they do not require insulation as with conventional concrete.

Having thus described my invention, other features and advantages will therefore be apparent, the scope of the invention to be limited only by the following claims.

What is claimed is:

1. A concrete mixture comprising coarse aggregate, fine aggregate, and a mixture of cement and sufficient ground scoria cinder of an average particle size in the range between 2,000 to 10,000 Blaine to provide a rapid cure cement of increased tensile strength, wherein said scoria cinder is substantially of the following composition:

| | |
|---|---|
| $SiO_2$ | 48.2 |
| $Fe_2O_3$ | 5.0 |
| $Al_2O_3$ | 14.8 |
| CaO | 17.4 |
| MgO | 7.0 |
| $SO_3$ | 0.2 | in parts by weight.

2. The concrete mixture of claim 1 wherein the scoria cinder comprises 10% to 30% by weight of the cement-scoria cinder mixture.

3. The concrete mixture of claim 2 wherein the coarse aggregate is gravel, the fine aggregate sand, and the scoria cinder has a Blaine size of 3,400.

4. A concrete mixture comprising cement and scoria cinder aggregate of graded particle size, wherein said scoria cinder has substantially the following composition:

| | |
|---|---|
| $SiO_2$ | 48.2 |
| $Fe_2O_3$ | 5.0 |
| $Al_2O_3$ | 14.8 |
| CaO | 17.4 |
| MgO | 7.0 |
| $SO_3$ | 0.2 | in parts by weight.

5. The concrete of claim 4 wherein about 18.8% of the scoria cinder aggregate has a particle size smaller than 100 mesh, and about 10.7% of the scoria cinder aggregate has a particle size smaller than 200 mesh.

* * * * *